Jan. 27, 1953  R. F. SHANK  2,626,768
AIRCRAFT ARRESTING GEAR
Filed Nov. 9, 1948  2 SHEETS—SHEET 2

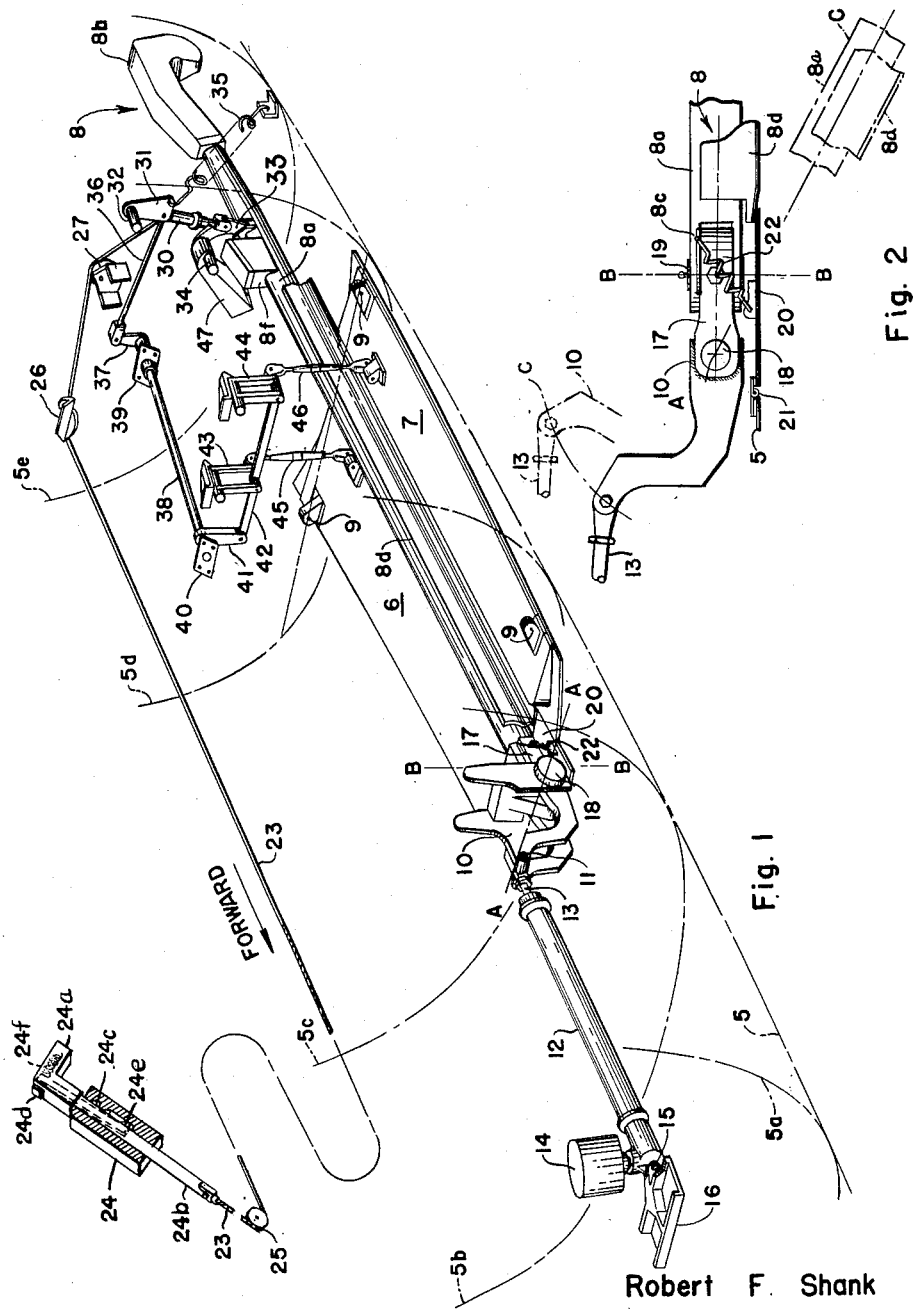

Robert F. Shank
*INVENTOR.*

Patented Jan. 27, 1953

2,626,768

UNITED STATES PATENT OFFICE 2,626,768

AIRCRAFT ARRESTING GEAR

Robert F. Shank, Los Angeles, Calif., assignor to North American Aviation, Inc.

Application November 9, 1948, Serial No. 59,064

18 Claims. (Cl. 244—110)

The present invention relates to aircraft and more particularly to improvements in retarding and restraining devices for aircraft such as arresting gear and the like.

The present invention is directed to improved arresting means for carrier-based and similar aircraft and more particularly to improved arrangements in the arresting gear and its operation before, during and after its use in an arrested landing upon the deck of an aircraft carrier or upon the ground. It is desirable in arresting gear installations to stow the arresting hook as completely as possible within a suitable well with a minimum disturbance to the aerodynamic characteristics of the aircraft. It is at the same time desirable to have the hook conveniently disposed for instantaneous release into its operative position beneath the aft portion of the fuselage with the possibility of its being jammed, or prevented from release, reduced to a minimum.

In providing an arresting hook which is positively projected into its operative position when released at the will of the pilot, it is also desirable that it be articulated with respect to the fuselage in such manner that it can swing about both horizontal and vertical axes within resiliently opposed limits as may be required by the direction or attitude of the aircraft in landing. Good design also dictates that the arresting gear be capable of foolproof and satisfactory operation under all conceivable flight and landing conditions. It also requires that in the case of a hard tail-down landing, the arresting hook be prevented from inadvertently re-engaging its up-latch; and on being struck by the downwardly moving fuselage that it engage major structural portions of the fuselage by suitable shock absorbing means in order to reduce the possibility of permanent damage to the aircraft structure.

The efficient aerodynamic characteristics of the aircraft are usually preserved or maintained by retracting the arresting gear and stowing the same within a well in the aft portion of the fuselage. In the case of the conventional tricycle landing gear type of aircraft currently used in carrier operations, the position of the arresting gear is appreciably forward of the tail of the aircraft and is accordingly in a further forward position in which it is more likely to affect the aerodynamics of the fuselage by disturbance of the slipstream than it would be if portions protruded in an extreme aft position as in an aircraft of the type which would normally have a tail wheel. In other words, in the case of high-speed airplanes of the tricycle landing gear type, it is desirable that the arresting gear be stowed as completely as possible and faired with fairings or doors which preserve to the maximum the streamline outer surface of the fuselage. It is also desirable in making proper landings upon the deck of a carrier that the engagement of the arresting hook of the airplane with the cable on the landing deck be made as positively as possible with a minimum of bouncing or rebound of the hook from the carrier deck.

The above and other desirable characteristics are obtained by the present improved arresting gear arrangement which consists essentially of an arresting hook which is pivotally mounted in an articulated manner upon the aircraft structure such that in its operative position it can swing within resiliently opposed limits about both horizontal and vertical axes. The improved arresting gear is disposed in its stowed position between a pair of inwardly movable fairing doors in such a relationship that the arresting gear shank is flush with the door surfaces and is accordingly self-fairing. The improved arrangement includes means for simultaneously drawing the fairing doors upwardly or inwardly as the arresting gear is released and lowered into its operative position, the inward movement of the doors providing clearance for lateral swinging of the arresting hook as the aft portion of the aircraft may be brought laterally downwardly during the landing and retarding operation. The invention also includes snubbing and hold-down means for the arresting hook which resiliently opposes approaching movements of the arresting hook and the fuselage while the hook is extended as well as serving to positively extend the hook when the same is released. Improved releasing mechanism is also included to provide for the simultaneous release of the arresting hook and the operation of the fairing doors and includes a blocking feature which positively prevents inadvertent re-engagement of the arresting hook with its uplatch device in the event of a hard tail-down landing.

It is accordingly a major object of the present invention to provide an improved arresting gear installation for carrier based aircraft in which the functioning of the arresting gear in its retarding and restraining operations is materially improved and the aerodynamic characteristics of the aircraft preserved by an improved storage arrangement of the arresting gear and its fairing in the stored position. A further object of the present invention resides in an improved mounting arrangement which includes an articulated connection providing pivotation in several directions with respect to the relatively fixed aircraft structure and an improved snubbing and hold-down means engaging the articulated mounting to positively project the hook in its operative position and to resiliently oppose its return toward, or into, the fuselage. It is a further object of this invention to provide an improved control and release mechanism for an arresting gear and its fairing means to insure positive and simultaneous movements of each in relatively opposite directions.

It is a still further object of the present invention to provide improved operating mechanism for the simultaneous release of an arresting gear assembly and the withdrawal of its fairing doors in an opposite direction to permit limited lateral movements of the arresting hook during landing within a portion of the airplane in which it was previously stored. A further object of this invention includes the provision of locking means associated with the release and operating mechanism arranged to prevent undesired re-engagement of the arresting hook with its latching device. A still further objective resides in an improved manual control means for releasing the arresting hook simultaneously with the fairing door retraction, for maintaining the blocking means in its operative position during landing and operation of the arresting gear; and for subsequently reconditioning the door operating mechanism and the blocking means to permit of manual retraction and latching of the arresting gear. Other objects and advantages of the present invention will become apparent to those skilled in the art after reading the present description taken in conjunction with the accompanying drawings forming a part hereof in which:

Fig. 1 is a perspective view of the aft portion of an aircraft fuselage showing the improved arresting gear installation and its associated mechanism with the fuselage shown in phantom;

Fig. 2 is a side elevational view of a pivotal mounting of the arresting gear and fairing upon the aircraft showing the arresting gear in both its retracted and extended positions;

Figure 3:
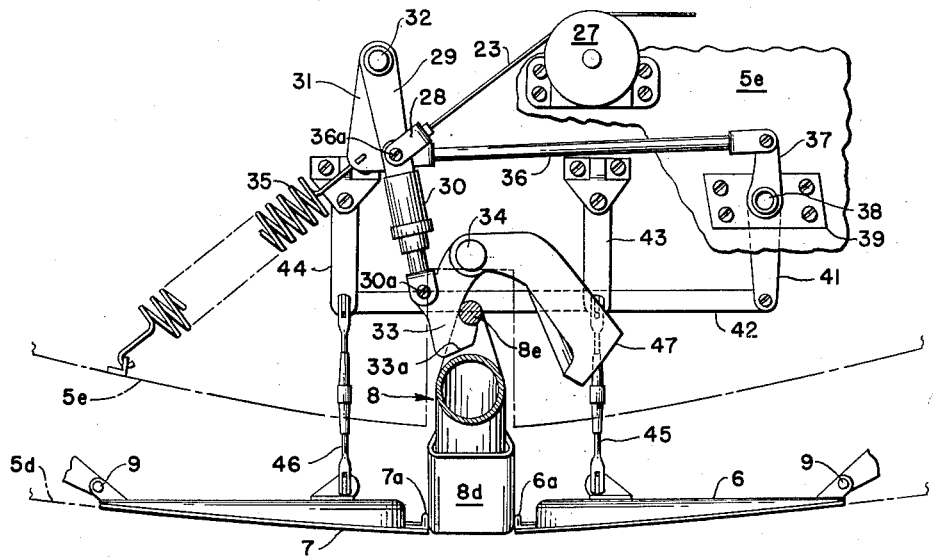
Fig. 3 is an enlarged elevational view looking forward with the arresting gear in its stowed position and the doors in their closed position.

Referring now to Fig. 1, the fuselage of an airplane is indicated fragmentarily in broken lines by the numeral 5 and several of the transverse formers or bulkheads in the aft portion of the fuselage are indicated at 5a, 5b, 5c, 5d and 5e. The bottom of the fuselage 5 is provided with an opening or well approximately extending from the bulkhead 5c to a point aft of the bulkhead 5d and this opening is arranged to be closed by the fairing doors or closures 6 and 7 which are pivotally hinged along longitudinal axes at the hinges 9. The doors 6 and 7 are hinged at their outer edges and their adjoining edges are spaced apart a sufficient distance laterally to provide space for the arresting gear assembly 8 which is partially housed, but not fully enclosed within the well in the fuselage.

The arresting gear assembly consists essentially of a tubular shank portion 8a pivotally linked to a hook mounting fitting 10 at its forward portion and is provided with a hook fitting 8b at its rearward terminal portion. The hook mounting fitting 10 is pivotally mounted upon the aircraft structure such that it is capable of rocking movement about the transverse axis A—A of the pivot 18 and this mounting fitting 10 is also pivotally connected at 11 to the snubbing cylinder 12. The latter continually urges the mounting fitting 10 to be rocked in the clockwise direction as viewed in Fig. 1, about the axis A—A, in which the arresting gear assembly 8 is also urged downwardly away from the lower portion of the fuselage. It will be understood that the snubbing cylinder assembly 12 is provided with a telescoping piston-rod element 13 which engages the aforementioned pivot 11 at its outer terminal and is under the influence of resilient and hydraulic means within the cylinder assembly 12 forming a snubbing cylinder of the oleo strut type. A suitable snubbing or shock absorbing cylinder of this general type is shown and described in connection with Figs. 1, 2, and 3 of the Sikorsky Patent No. 1,898,694 which issued February 21, 1933, for a Shock Absorber. The forward terminal of the snubbing cylinder 12 is provided with a reservoir 14 for the hydraulic fluid and is pivotally attached at 15 to a mounting fitting 16 which is securely fastened to the fuselage structure.

The mounting fitting 10 is also provided with a vertical pivot B—B which passes through the forward bifurcated portion 8c of the arrester hook assembly 8 and an articulated link 17 which connects the hook assembly with the mounting fitting 10. This articulated connection is more clearly shown in Fig. 2 and pivot pins 18 and 19 of a size adequate to take the restraining impacts are provided for the rotation about the horizontal and vertical axes A—A and B—B, respectively. The tubular shank 8a of the arresting gear assembly is provided with a fairing plate 8d of a U-shape in cross-section against which the edges of the doors 6 and 7 are adapted to closely abut in a sealed relationship when the doors and the arresting gear are in the retracted and faired position shown in Fig. 1. In order to seal and fair the space beneath the articulated connection at the forward terminal 8c of the landing hook assembly an auxiliary fairing door 20 is hinged at 21 to the bottom skin of the fuselage 5. This auxiliary door 20 extends rearwardly where its rear edge is engaged by the fairing member 8d of the landing hook, the auxiliary door being disposed between the inwardly extending edges of the main doors 6 and 7 adjacent their forward portions. A spring 22 interconnects the auxiliary door 20 with the forward terminal 8c of the arresting hook such that the auxiliary door may follow the downward movements of the hook and be returned by the spring 22 when the hook is again restored to its stowed position.

A release cable 23 extends from the pilot control device 24 and handle 24a disposed in the pilot's cockpit, the cable running over the guide sheaves 25, 26 and 27 to a terminal fitting 28 on a break-link fitting 29—30. A fitting 31 is mounted on a common shaft 32 with the upper portion 29 of the break-link 29—30 as more clearly shown in Figs. 3 and 4. A retaining latch 33, having a camming face 33a, is provided as an uplatch for the hook assembly 8 which is provided with the latching lug 8e. The retaining latch 33 is pivotally mounted at 34 and is pivotally connected at 30a to the lower half 30 of the break-link 29—30, the lower link 30 being a bungee in the form of a spring opposed piston-cylinder element providing a resiliently opposed lost-motion device between the pivots 32 and 34. It will accordingly be noted that a pull upon the control handle 24a of the pilot control 24 tends to rotate the member 33 in a clockwise direction about its pivot 34, thereby disengaging the hook terminal of the retaining latch 33 from the retaining lug 8e on the hook assembly. A tension spring 35 is connected at one terminal to the fuselage structure in the region of the bulkhead 5e and at its opposite terminal it is attached to the fitting 31 in such manner that when the forward pull on the cable 23 is released, the break-link fitting 29—30 is again restored by the pull of the spring 35 to its aligned position in which the retaining latch 33 is rotated in a counter-clockwise direction to the position shown in Fig. 3 in which it either engages the lug 8e, or is engaged by the lug when it is returned to the stowed position of the hook. The retaining latch 33 is provided with the cam face portion 33a opposite the hook recess in order that the returning lug 8e on the arresting hook 8 may deflect the retaining latch by an initial rotation in a clockwise direction against the opposition of the spring until the lug passes into the recess of the hook portion at which point the spring 35 again straightens the break-link 29—30 to return the retaining latch 33 into the position shown in Fig. 3.

The pilot control for the release cable 23, as shown in Fig. 1, is of the type provided with a pawl or ratchet arrangement and a pawl 24e on the plunger 24b attached to the handle 24a engages either one of the two notches 24c within the housing or support fitting 24. In Fig. 1 the handle 24a is shown in its fully inserted position within the housing 24 in which condition the cable 23 is slackened off to permit its movement generally rearwardly toward its terminal fitting 28 between the aligned links 29 and 30, as shown in Fig. 3, in which the arresting hook is latched in its retracted position. To trip the latch 33, the handle 24a is pulled away from its housing 24, the shank 24b pulling the main portion of the cable 23 forward, breaking the aligned struts 29—30 to the position of Fig. 4, the spring 24f urging the pawl 24e into the recess 24c in the housing. To permit reinsertion of the handled-shank 24a—24b, the button 24d is depressed against the biasing spring 24f, thereby withdrawing the pawl 24e from the recess 24c to permit the manual lifting and retraction of the hook, overcoming the opposition to the spring in the strut unit 12 and providing for the automatic latching of the hook in the retracted position. This mechanism permits the handle 24a to be pulled to release the arresting gear and the handle is retained in the "out" position by the above described pawl arrangement to also maintain the fairing doors in their opened position by means of the mechanism which is about to be described. Simultaneously with the action of releasing the hook assembly 8 by outward pull on the handle 24a and release cable 23, an interconnecting rod and bellcrank system initiated by lateral movement of the rod 36 imparts concurrent, but opposite and upward, movement of the fairing doors 6 and 7. The interconnecting rod 36 is pivotally connected to the intermediate connection 36a between the links 29 and 30 comprising the break-link unit and is pivotally connected at its opposite terminal to a lever 37 pivotally supported upon the torque shaft 38. The latter is journalled for rotation within the brackets 39 and 40 supported upon the respective bulkheads 5e and 5d. Adjacent the forward terminal of the torque shaft 38 it is provided with a depending lever 41 pivotally mounted thereon and is in turn pivotally connected to the transverse link 42. Swinging links 43 and 44 are pivotally supported from their upper terminals and are pivotally connected to the lateral link 42 at their lower ends. The pivotal connection of the links 42 and 43 is connected to the door 6 by means of an adjustable rod 45, preferably provided with a turnbuckle for adjusting its length, and the pivotal junction of the links 42 and 44 is similarly connected by an adjustable rod 46 to the door 7.

Figure 4:
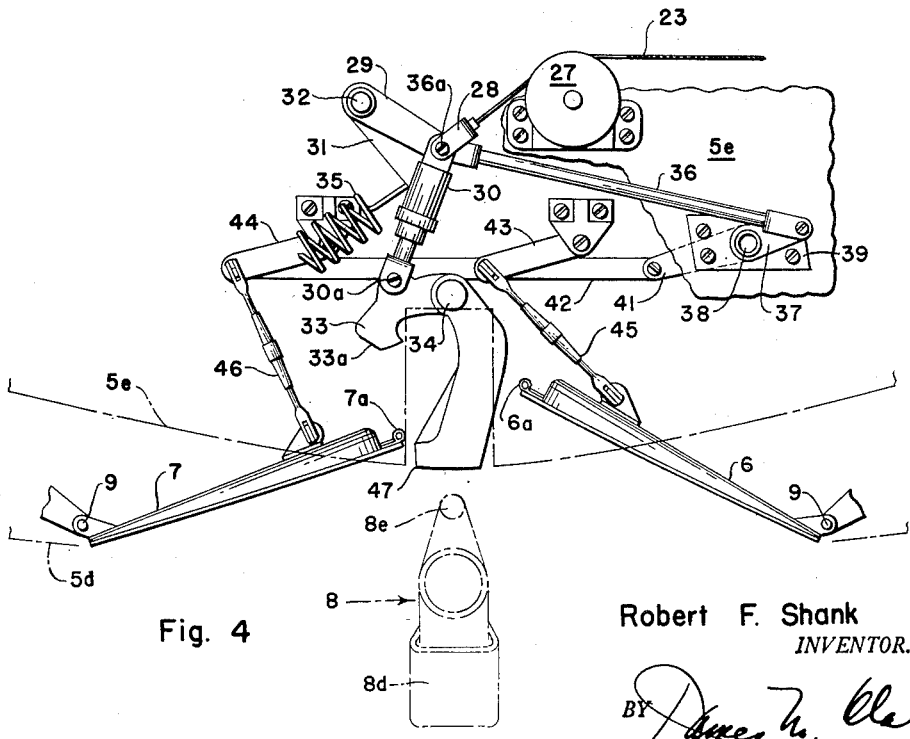
Fig. 4 is a similar view after the arresting gear has been released, the doors withdrawn into their open position and the blocking means extended into its operative position.

It will accordingly be seen that as the release cable 23 is pulled forward, or towards the right in Fig. 3, the break-link 29—30 will be caused to collapse, rotating the retaining latch 33 in the clockwise direction to release the arresting hook assembly 8 and simultaneously moving the push rod 36 to the right, imparting clockwise rotation to the torque shaft 38 and movements of the link 42 to the left in Fig. 3 causing the adjustable rods 45 and 46 to lift the respective doors 6 and 7 upwardly into the position shown in Fig. 4. As may be seen in the latter figure, this permits of additional lateral clearance for the arresting hook assembly as it may be caused to swing laterally about the vertical axis B—B at the forward anchored terminal of the arresting hook. A blocking bumper 47 is fixedly attached to rotate with the retaining latch 33 about the pivot 34 such that in the released condition of the hook and the open position of the doors as shown in Fig. 4, the bumper block 47 is caused to be rotated into the space formerly occupied by the arresting hook and its bumper portion 8f while the hook was in its retracted position. The member 8f is fixedly attached to the shank 8a of the arresting gear and serves as a resilient bumper pad to prevent damage to the adjacent aircraft structure in the event of the gear rebounding upon striking the landing surface, inasmuch as some 15 to 20 degrees of lateral horizontal movement of the hook may desirably be provided on each side of the longitudinal center line and about the pivot axis B—B. At the same time, the blocking element 47, which forms an integral assembly with the retaining latch 33, is rotated into the position shown in Fig. 4 in which it serves to prevent the arresting hook assembly and its latching lug 8e from re-engaging the up-latch formed by the retaining latch 33. The blocks 8f and 47 are so located in the longitudinal direction that the former will strike the latter upon excessive rebound from the carrier deck and the shock thus absorbed by the resilient means within the bumper block 8f to thereby prevent damage to the fuselage structure.

As indicated above, when the handle 24a is pulled upwardly, the arresting gear is released and is urged downwardly and outwardly by the spring in the snubbing cylinder 12. As indicated above, the unitary fitting 10—17 is rockable about the transverse pivot 18, or the axis A—A, and in view of its forwardly and rearwardly extending arms terminating in the pivotal connections 11 and 19, respectively, it forms a bell-crank arrangement with an offset forward arm and the arresting hook forming an articulated portion of its rearwardly extending arm. The bell-crank 10—17 is urged in the clockwise direction, as viewed in Fig. 1, by the spring within the extensible unit 12, and is urged in the opposite direction, either by forces developed during landing or by the manually applied lifting forces after landing. As indicated in Fig. 2, the full extension of the unit 12 to its limiting position causes the arresting hook assembly to be rotated about the axis A—A to its fully extended operative position as shown by the dotted line position C, in which it is projected to the desired extent for an arrested landing. At the same time, the handle 24a is retained in the "out" position to maintain the fairing doors 6 and 7 in their opened positions. The arresting gear may be stowed and latched only by manual means when the ship is on the ground, or on the carrier deck, and for such purpose the spring loaded release 24d—24f is provided for disengaging the pawl 24e in the control device 24, permitting the handle 24a to be returned to its original position, relaxing the tension on the cable 23 to allow the fairing doors 6 and 7 to close under the influence of the spring 35. As the fairing doors close, the retaining latch 33 is brought into engaging position with the lug 8e of the arresting gear such that when the latter is raised manually into the retracted position it will be retained by this uplatch. The small bungee provided in the lower break-link 30 in connection with the retaining latch is compressed to allow the latch to engage as the gear is raised to the stowed position shown in Fig. 3. As the arresting gear assembly is brought upwardly to its stowed position and the doors are lowered to their faired position shown in Fig. 3, the rubber bulb sections 6a and 7a on the edges of the respective doors 6 and 7 contact the fairing member 8d of the gear and serve as a seal to complete the continuity of the streamlined undersurface of the fuselage 5 as shown in Fig. 3.

It will accordingly be noted that in the retracted position the arresting hook 8 fits closely between the fairing doors 6 and 7, lying in a flush position externally, but not contained wholly within the doors. By this arrangement it is possible to retract the doors inwardly simultaneously as the arresting hook is released, thereby obtaining the required clearance for lateral movement of the arresting hook. This is accomplished by the present arrangement, without any delay or loss of time incurred by successive movements such as by opening the fairing doors initially followed by a release of the arresting hook in a further or secondary operation. By the disclosed arrangement, the joint or simultaneous operation of extending the hook and retracting or opening the fairing doors is accomplished automatically in a time-saving arrangement and in a foolproof and satisfactory manner which prevents interference of these elements. As has been indicated above, the mechanism is such that as the arresting hook is released, it is prevented from being latched up again while the aircraft is in motion and can only be reset manually when the aircraft is at rest upon the ground or upon the carrier deck.

While a preferred form of the present invention has been shown and described it will be understood that the present invention is capable of being extensively modified within the scope of the present concept. Accordingly, other forms and modifications of this invention, both with respect to its general arrangement and the details of its several elements, which may occur to those skilled in the art, are intended to come within the scope and spirit of this invention as more particularly set forth in the appended claims.

I claim:
1. In an aircraft structure, an arresting gear including an arresting hook pivotally attached to the aircraft structure and fairing means separately mounted upon the aircraft structure for fairing said arresting hook in its retracted position, manually controlled means operatively associated with said arresting hook and operatively connected to said fairing means for moving said fairing means inwardly of said aircraft structure as said arresting hook is released for dropping therefrom into an operative extended position.

2. In an arresting gear installation for an aircraft structure, an arresting hook pivotally connected to the aircraft structure for movement between stowed and extended positions, a lower portion of the aircraft structure arranged to provide a space for stowing said arresting hook in its retracted position, fairing means hingedly mounted upon the aircraft forming with an exposed portion of said arresting hook in its retracted position a continuous outer surface for said stowage space, and operating mechanism for releasing said arresting hook into its extended position and retracting said fairing means within said stowage space to provide greater clearance for said extended arresting hook beneath said stowage space.

3. In an aircraft arresting gear, an aircraft structure, an arresting hook pivotally mounted upon the aircraft structure for movement between stowed and extended positions, a lower portion of the aircraft structure arranged to provide a well for the stowage of said arresting hook in its retracted position, fairing means hingedly mounted upon the aircraft structure complementing the streamlined external surface of the aircraft and an exposed portion of said landing hook while in its stowed position, and operating means operatively associated with said arresting hook and said fairing means for moving said fairing means inwardly of said well as said arresting hook is moved outwardly therefrom toward its extended position.

4. In an arresting gear for an aircraft structure, a mounting member in the form of a bellcrank pivotally carried by the aircraft for limited rocking movements about a transverse axis, an arresting hook pivotally attached to said mounting member at a pivot connection having a vertical axis disposed aft of said transverse axis, and extensible means including a resiliently opposed piston and cylinder unit interposed between the aircraft structure and a pivotal connection on said mounting member forward of and above said transverse axis in the retracted position of the arresting gear for rocking said bellcrank member about said transverse axis to extend said pivotally attached arresting hook downwardly into its extended position.

5. In an aircraft arresting gear, an aircraft structure, an arresting hook pivotally mounted upon the aircraft structure for limiting movements about vertical and transverse axes, a lower portion of the aircraft structure arranged to provide a well for storing said arresting hook in its retracted position, an underportion of said arresting hook exposed to the airstream in the retracted position of said arresting hook, fairing doors movably mounted upon the aircraft structure arranged to complementarily fair said exposed portion of said arresting hook, and manual control means operatively associated with said arresting hook and with said fairing doors for simultaneously releasing said arresting hook from said retracted position and withdrawing said fairing doors into said stowage well.

6. In an arresting gear for aircraft, an arresting hook pivotally mounted upon the aircraft for limited movements about transverse and vertical axes, means movably mounted upon the aircraft for fairing an exposed portion of said arresting hook, latch means engaging said arresting hook for retaining the same in its retracted position, control means for simultaneously tripping said latch means for the release of said arresting hook and movement of said fairing means, and blocking means associated with said latch means arranged to prevent re-engagement of said latch means by said arresting hook.

7. In an aircraft, aircraft structure, an arresting gear including an arresting hook pivotally attached to the aircraft structure, fairing means separately mounted upon the aircraft structure for fairing said arresting hook in its retracted position, and latch means operatively associated with said arresting hook for the release of said arresting hook into an operative extended position, manually controlled means operatively connected to said latch means and to said fairing means for concurrently moving said fairing means inwardly of said aircraft structure as said arresting hook is unlatched and released for dropping therefrom into its operative extended position.

8. In an arresting gear installation for an aircraft structure including an arresting hook pivotally connected to the aircraft structure, a lower portion of the aircraft structure arranged to provide a space for the stowing of said arresting hook in its retracted position, fairing means hingedly mounted upon the aircraft structure for forming together with an exposed portion of said arresting hook a continuous outer surface for said stowage space, and latch means operatively associated with said arresting hook for the release of said arresting hook into an operative extended position, operating mechanism connected to said latch means and to said fairing means for retracting said fairing means into said stowage space as said arresting gear is unlatched and released into its operative extended position such that upward deflection of said arresting hook during an arrested landing permits movement within said stowage space without interference with said fairing means.

9. An aircraft, an arresting gear comprising a bell-crank member pivotally mounted upon the aircraft for movement about a substantially horizontal transverse axis, actuating means including a resiliently extensible piston and cylinder unit pivotally interconnecting said bell-crank member with fixed aircraft structure for imparting movement to said bell-crank member about said transverse axis, an arresting hook pivotally mounted upon a vertical axis upon said bell-crank member for positive movement therewith about said transverse axis and for limited movement with respect thereto about a substantially vertical axis, and control means including a releasable latch for subjecting said bell-crank member to said actuating means for the rotation of said bell-crank member about said transverse axis for the extension of said arresting hook from a retracted position in which it lies substantially parallel to the axis of said actuating means to an extended operative position in which it is articulated for limited pivotal movements about said axes and excessive pivotal movement about said transverse axis is opposed by said actuating means.

10. In an arresting gear mechanism, an arresting hook pivotally mounted upon a supporting structure, detent means carried by said arresting hook, latch means supported from said structure engageable with said detent means for retaining said arresting hook in a retracted position, blocking means operatively associated with said latch means and manual operating mechanism connected to said latch means for the disengagement of said detent means, the release of said arresting hook and the movement of said blocking means into a position in which said arresting hook is prevented from returning to its fully retracted position.

11. In aircraft arresting mechanism, an arresting gear operatively mounted upon the aircraft for movement between extended and retracted positions, a transverse bulkhead having a recess in its lower portion into which said arresting gear is retractable, manually operated mechanism for the release of said arresting gear from said retracted position in said bulkhead recess, and blocking means operatively associated with said operating mechanism for blocking said recess and continuing the lower surface of said bulkhead underportion for preventing said arresting gear from entering said recess during an arrested landing.

12. In aircraft, an aircraft structure, an arresting gear comprising an arresting hook pivotally mounted for limited horizontal and vertical movements, latch means engaging said arresting hook for retaining the same in its retracted position, actuating means interposed between said arresting hook and the aircraft structure for rotating said arresting hook into an extended operative position, manual control means for tripping said latch means for the release of said arresting hook from its retracted into its extended operative position, and blocking means actuated by release of said latch means arranged to prevent re-engagement of said arresting hook with said latch means during an arrested landing.

13. An aircraft structure, an arresting gear comprising an arresting hook pivotally mounted for limited horizontal and vertical movements, latch means engaging said arresting hook for retaining the same in its retracted position, actuating means interposed between said arresting hook and the aircraft structure for rotating said arresting hook into an extended operative position, manual control means for tripping said latch means for the release of said arresting hook from its retracted into its extended operative position, blocking means actuated by release of said latch means arranged to prevent re-engagement of said arresting hook with said latch means and resetting means for removing said blocking means to permit latching of said arresting hook in its retracted position.

14. In aircraft arresting mechanism, an aircraft structure, an arresting gear operatively supported from said aircraft structure for movement between inoperative retracted and operative extended positions, detent means carried by said arresting gear, latch mechanism operatively supported from said aircraft structure engageable with said detent means for locking said arresting gear to said structure in its inoperative retracted position, blocking means operatively associated with said latch means, bumper means carried by said arresting gear, and manually operated mechanism operatively associated with said latch means for the unlatching release of said arresting gear and the positioning of said blocking means where it is engageable by said bumper means upon upward deflection of said arresting gear for prevention of its return to said retracted position.

15. In aircraft, an aircraft structure, an arresting gear comprising a bell-crank member pivotally mounted upon the aircraft for movement about a substantially horizontal transverse axis, actuating means pivotally interconnecting said bell-crank member with the aircraft structure for imparting movements to said bell-crank member about said transverse axis, an arresting hook pivotally mounted upon said bell-crank member for limited movement about a substantially vertical axis, control means for unlatching said arresting gear and subjecting said arresting gear to said actuating means for the rotation of said bell-crank member about said transverse axis for the extension of said arresting hook from a retracted position in which it lies substantially parallel to the axis of said actuating means to an extended operative position in which it is articulated for limited pivotal movements about said axes, and excessive pivotal movement about said transverse axis is opposed by said actuating means and blocking means actuated by release of said control means to prevent movement of said arresting hook into its fully retracted position.

16. In an arresting gear, an aircraft, an arresting hook pivotally mounted upon the aircraft for movement between retracted and extended positions, a fairing door movably mounted upon the aircraft for fairing an exposed portion of said arresting hook in its retracted position, latch means engaging said arresting hook for retaining said arresting hook in its retracted position, control means for simultaneously tripping said latch means for the release of said arresting hook from its retracted position and movement of said fairing door, blocking means actuated by release of said arresting hook to block undesired re-engagement of said arresting hook with said latch means while in an operative condition, and resetting means associated with said control means for restoring said latch means for retention of said arresting hook in its retracted position.

17. In an aircraft arresting gear, an aircraft structure, an arresting hook pivotally mounted upon the aircraft structure, a fairing door pivotally mounted upon the aircraft structure laterally of said arresting hook, manual means operatively associated with said arresting hook and with said fairing door for releasing said arresting hook and moving said fairing door upwardly and inwardly of the aircraft away from said released arresting hook, resilient means for urging said arresting hook into its extended lowered position, such movement of said fairing door upwardly and said lowering of said arresting hook serving to provide a wider space within the confines of the aircraft within which said arresting hook may move upwardly in released position without interference with said fairing door.

18. In an arresting gear for an aircraft structure, an arresting hook pivotally mounted upon the aircraft structure for movements between stowed retracted and operative extended positions, door means movably mounted upon the aircraft structure arranged for fairing said arresting hook in its stowed retracted position, and means operatively associated with said arresting hook and said fairing door means for simultaneously releasing said arresting hook and inwardly retracting said fairing door means such that said arresting hook in its operative extended position may be caused to operate by forces applied in an arrested landing within a portion of the stowage space normally occupied by said arresting hook in its stowed retracted position and as made available by said inward retraction of said fairing door means.

ROBERT F. SHANK.

REFERENCES CITED

The following references are of record in the file of this patent:

UNITED STATES PATENTS

| Number | Name | Date |
|---|---|---|
| 1,647,619 | Hall | Nov. 1, 1927 |
| 1,893,591 | Minshall | Jan. 10, 1933 |
| 2,092,204 | Brown | Sept. 7, 1937 |
| 2,338,046 | Lloyd | Dec. 28, 1943 |
| 2,452,911 | Dickerman | Nov. 2, 1948 |
| 2,454,081 | Molloy et al. | Nov. 16, 1948 |
| 2,457,625 | Amiot | Dec. 28, 1948 |
| 2,486,418 | Jolly | Nov. 1, 1949 |
| 2,505,652 | Schweitzer et al. | Apr. 25, 1950 |

FOREIGN PATENTS

| Number | Country | Date |
|---|---|---|
| 792,022 | France | Oct. 14, 1935 |